Jan. 30, 1934.                O. L. INGRAM                1,945,042
                            LIQUID LEVEL GAUGE
                            Filed April 8, 1931
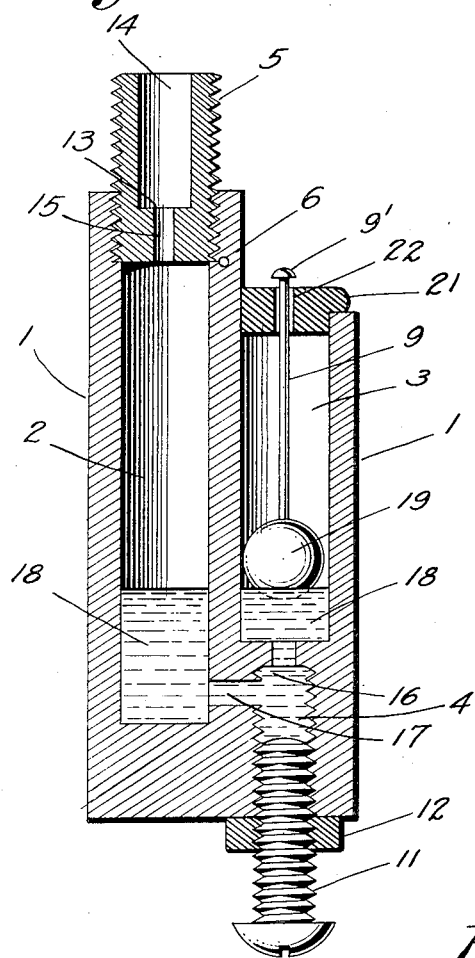
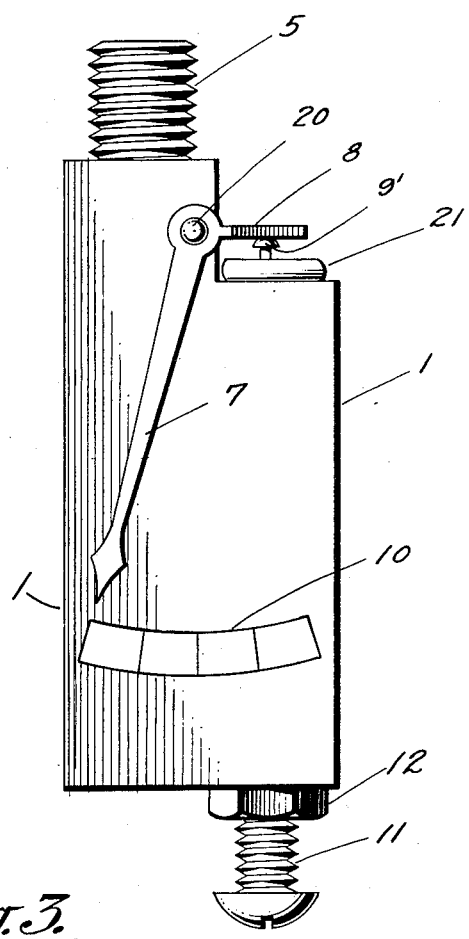
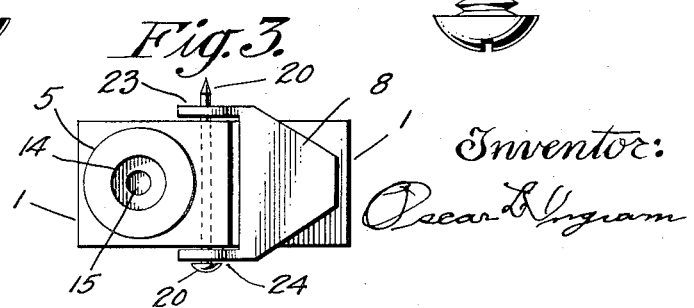
Inventor:
Oscar L. Ingram Patented Jan. 30, 1934

1,945,042

UNITED STATES PATENT OFFICE 1,945,042

LIQUID LEVEL GAUGE

Oscar L. Ingram, Walla Walla, Wash.

Application April 8, 1931. Serial No. 528,561

6 Claims. (Cl. 73—31)

My invention relates to improvements in liquid level gauges in which hydrostatic pressure is used, and wherein the common air-bell, well known to the art is placed in a tank of liquid to be gauged, and a mechanism commonly known as a gauge-head is attached, for instance, to the instrument board of an automobile, the two parts, the gauge-head and the air-bell, being attached to each other by means of a hollow wire, commonly termed an air line. The objects of my improvement are, first, to provide a U tube construction, which may be made of a single piece, such as a die casting; second, to provide such piece with two substantially parallel chambers, one of which is divided into an upper compartment called a float chamber, and a lower compartment, called a sub-chamber; third, to provide a simple means whereby a liquid may be held in the sub-chamber or permitted to enter the upper compartment for operative purposes or the level thereof raised or lowered for adjustment purposes; fourth, to provide a gauge head of the type mentioned, and wherein a liquid is used as a pressure-receiving element, but wherein the movement of the liquid is converted into a mechanical movement so that the registering is by means of a pointer; and, generally speaking, to provide such a gauge-head wherein the construction is economical and efficient and the operation of which is delicate and accurate.

I attain these objects by the construction illustrated in the accompanying drawing, in which—

Fig. I is a sectional view of the gauge-head, showing the main gauge-head piece or block; the relationship of the primary chamber 2, the float chamber 3, sub-chamber 4, and a passageway 17, together with the moving parts of the gauge-head.

Fig. II is a face view of one side of the gauge-head, and shows graduations 10, the indicating member 7, and its arm 8.

Fig. III is a top view of the gauge-head, showing the manner of mounting the arm 8, and its broad flat form, and also showing the manner in which the pointer 7 is mounted to swing from the pin 20.

I will now more particularly describe the construction of my device and the manner in which it operates. As stated above, I construct my main gauge-head piece from a single piece of material, such as a block of steel, a die casting, or other metal or material. In this block or piece I provide the primary chamber 2, the float chamber or compartment 3 and the sub-chamber 4. The three chambers are designed and intended to hold a heavy liquid, such as mercury, and the three chambers communicate with each other by means of the passageway 17. The sub-chamber 4 is threaded to receive a screw 11. The functions of this crew 11 will be described hereinafter. I term the piece having three chambers therein the main gauge-head piece because it carries the various parts of the gauge-head.

In the float chamber 3 I provide a light float 19, which is more or less in the form of a ball. This float 19 has an upward-extending part, or pin 9, passing through the hole 22 in the cap piece 21, all as shown in Fig. I. By reference to Figs. II and III it will be seen that the indicating member 7 is so bent or formed that it may be provided with the two bearing holes 23 and 24 through which the pin 20 is passed. This pin 20, of course, passes through a hole 6, in the main gauge-head piece 1, thus providing a suitable axis or bearing for the indicator 7 to swing from.

By reference to Fig. III it will be seen that the lower part of the short arm 8 rests upon the head 9' of the pin 9. It might be said here that I prefer to use an ordinary household pin for this pin. Thus it will be seen that if the float 19 rises it will move the short arm 8 and thus move the indicator 7 with reference to the graduated scale 10. One of the novel and nice features of my device is the manner in which the indicator 7 is mounted whereby it hangs downward, as this construction makes it easy to nicely balance the indicator so that its own weight will very lightly tend to bring the indicator pointer to the "0" mark on the graduated scale. This construction also makes it possible and easy to provide a neat and compact unit in the gauge-head as a whole.

As will be seen by reference to Fig. I, I provide my device with the usual and ordinary nipple 5 for the purpose of attaching an airline, such as is well known in this art. I will call attention to the fact that in my nipple 5, however, I provide a relatively long bore 14 terminating in a seat or shoulder 13. This is for the purpose of permitting the use of a long tubular shaped rubber gasket, in order to make the device absolutely air tight when the air line is attached by a nut to the nipple 5.

Inasmuch as most any sort of a casing or housing may be used for my gauge-head, such as is common to devices of this nature, I do not deem it necessary to show my device mounted in any particular sort of a casing; but it will be understood, of course, that preferably some sort of a casing or housing be used by which it may be attached to the instrument board of an automobile in the manner usual to such devices.

Having thus described the details of the construction of my device I will now describe the manner of its use and operation.

I will assume that the gauge substantially as shown and described has been provided and is ready to be put into use. The screw 11 is turned upward as far as it will go to contact tightly with the shoulder or seat 16 and a lock nut 12 is then tightened. Mercury is then placed in the primary chamber 2, and a cork or stopper of some sort is placed in the long bore 14 of the nipple 5. The gauge-head is now ready to be shipped or otherwise handled prior to its actual use, without fear of losing the mercury. I will now assume that the gauge-head has been so made, shipped and handled and is ready to be used, having first been attached to the instrument board of an automobile, for instance, in the manner common to such instruments; and that the ordinary air-line common to such devices, having the ordinary air-bell resting in the liquid to be gauged, has been attached to the nipple 5 by means of the nut common to such devices, and the rubber gasket I have described herein. The screw 11 is backed downward a few turns and the mercury 18, as shown in Fig. I, flows into the sub-chamber 4, and into the float chamber 3, until a natural level is reached. The screw 11 may then be moved either way necesssary to let more or less of the mercury go into the sub-chamber, and this will, of course, raise or lower the level of the mercury in the float chamber, thus raising or lowering the float 19.

When gasoline or other liquid is placed in a tank in which rests the air-ball common to these devices the pressure of the air in the air-bell will be transmitted to the primary chamber 2 and will cause the mercury in that chamber to be lowered, and this will cause the mercury in the float chamber 3 to rise accordingly. When the mercury in the float chamber 3 rises it will, of course, carry the float 19 upward and the pin 9 will press against the underside of the arm 8 causing the indicator 7 to move along the graduated scale 10, thus registering the pressure in the air-bell, and indicating the depth of the liquid in the fuel tank. As stated before, the indicator 7 is so nicely balanced that it will of its own weight tend very lightly to rest at the "0" mark on the graduated scale 10, thus when the pressure in the primary chamber 2 is lessened by the lowering of the level of the liquid being gauged the level of the mercury in the float chamber is lowered and the indicator 7 will tend to approach the "0" mark, thus registering the amount of fuel in the fuel tank, in which rests the air-bell hereinbefore mentioned.

It will be observed that the distance from the head of the slidable pin 9 to the axis pin 20 is much less than the length of the downward and indicating part of the pointer 7, therefore, any movement of the arm 8 is greatly multiplied at the indicating end of the indicator 7. This is necessary because the specific gravity of mercury is so much greater than the specific gravity of gasoline or any other fluid that might be gauged, and the float 19, therefore, only moves slightly when the level of the gasoline or other fuel is varied considerably.

In this specification and in the annexed claims I use the word "gauge-head". This term refers to that part of the usual liquid level gauge which attaches to the instrument board of an automobile, as an assembly, as distinguished from the air-bell or "tank-piece", and the air-line.

Having described my invention, what I claim as new and desire to secure by Letters Patent is:

1. In a liquid level gauge, a main gauge-head piece having a part suitable for connecting a pressure air-line thereto, and having a plurality of chambers therein; a liquid in said chambers; a floating member in one of the chambers having a sliding movement therein; registering means moveable by the floating member; an opening between two of the chambers, and a threaded piece associated with the opening whereby the opening may be closed to prevent the liquid from entering the chamber wherein the float slides, or may be opened to admit the liquid to said chamber.

2. In a liquid level gauge, a main gauge-head piece having a part suitable for connecting a pressure air-line thereto, and having a plurality of chambers therein; a liquid in said chambers; a floating member in one of the chambers having a sliding movement therein; registering means associated with the floating member; an opening between two of the chambers, and a threaded piece so associated with the opening that the opening may be closed thereby to prevent the liquid from entering the chamber wherein the floating member slides and may thereafter be opened by said threaded piece to admit the liquid to said chamber, said threaded piece being further movable to adjust the level of the liquid in the chambers.

3. In a liquid level gauge, a main gauge-head piece having a part suitable for connecting a pressure air-line thereto, and having a plurality of communicating chambers therein; a liquid in said chambers; a slidable floating member in one of the chambers comprising a main body having an upward extending stem-like part; a graduated scale; a registering piece having a downward extending pointer part movable across a portion of the main gauge head piece containing said chambers and across the graduated scale; and having an arm part shorter than the pointer part and extending at an angle thereto movable by the upward movement of the floating member to move the pointer part.

4. In a liquid level gauge, a main gauge-head piece having a part suitable for connecting a pressure air-line thereto, and having a plurality of communicating chambers therein; a liquid in said chambers; a movable indicator; graduations on the gauge-head piece; the indicator having a downward extending part movable across the portion of the gauge-head piece containing the chambers and across the graduations, and having an arm that is shorter than the downward extending part; the downward extending part and the arm being so related to each other as to weight that they delicately balance that the pointer part tends to move toward the zero mark of the graduations; a floating member in one of the chambers comprising a main body part having a stem-like part extending upward to contact with the shorter arm whereby an upward movement of the floating member will move the shorter arm substantially an equal distance with it and the downward extending part a greater distance.

5. In a liquid level gauge, a main gauge-head piece having a part suitable for connecting a pressure air-line thereto, and having a plurality of communicating chambers therein; a liquid in said chambers; a floating member in one of the chambers having a sliding movement up and down and comprising a main floating body having an upward extending stem-like part; a graduated scale adjacent to and across the lower portion of the main gauge-head piece; a registering piece having a downward extending part movable across the scale and having an arm part which is shorter than the downward extending part, extending over the chamber containing the floating member and movable by the upward movement of the floating member to move the downward extending part across the graduated scale.

6. In a liquid level gauge, a main gauge-head-piece having a part suitable for connecting a pressure air-line thereto, and having a plurality of communicating chambers therein; a liquid in said chambers; a floating member in one of the chambers having a sliding movement up and down; a graduated scale adjacent to and extending across the portion of the main gauge-head piece wherein the chambers are located; a registering piece having a downward extending part movable across the graduated scale; and suitable connection between the registering piece and the floating member whereby a short movement of the floating member will move the downward extending part of the registering piece a greater distance.

OSCAR L. INGRAM.